United States Patent [19]
Pitzer

[11] 3,812,727
[45] May 28, 1974

[54] ACCELEROMETER
[75] Inventor: Robert L. Pitzer, Arcadia, Calif.
[73] Assignee: Edcliff Instruments, Monrovia, Calif.
[22] Filed: Sept. 14, 1972
[21] Appl. No.: 288,951

Related U.S. Application Data
[63] Continuation of Ser. No. 92,453, Nov. 24, 1970, abandoned.

[52] U.S. Cl............................................. 73/516 R
[51] Int. Cl. ......................................... G01p 15/12
[58] Field of Search .......... 73/516 R, 517 R, 517 B, 73/514, 515; 340/17

[56] References Cited
UNITED STATES PATENTS
2,332,994  10/1943  Draper et al...................... 73/497 X
2,617,912  11/1952  Colvin............................... 338/31 X
2,831,670  4/1958   Bowrns et al. ..................... 73/516 R
2,883,176  4/1959   Bernstein ......................... 73/516 R
2,945,378  7/1960   Martin .......................... 73/516 R X
3,076,343  2/1963   Dumas et al. ..................... 73/517 B
3,104,552  9/1963   Bouchard..................... 73/516 R X
3,240,073  3/1966   Pitzer................................ 73/517 R Primary Examiner—James J. Gill

[57]  ABSTRACT

Seismograph, or moving mass, type of accelerometer in which the sensing mass has substantially the same diameter as the housing in which it is mounted. A potentiometer is utilized as an output transducer, and the unit is filled with a light weight oil to provide damping of the movements of the mass.

5 Claims, 5 Drawing Figures

PATENTED MAY 28 1974

INVENTOR.
Robert L. Pitzer
BY Flehr, Hohbach, Test,
Albritton & Herbert
Attorneys

ACCELEROMETER

This is a continuation, of application Ser. No. 92,453 filed Nov. 24, 1970, now abandoned.

BACKGROUND OF THE INVENTION

This invention pertains generally to accelerometers and more particularly to an accelerometer of the seismograph, or moving mass, type.

Accelerometers are widely used in airplanes, missiles, space vehicles and other aircraft. When used in the guidance systems of aircraft, accelerometers provide a convenient means of detecting deviations from a predetermined course. Accelerometers are also used to detect mechanical vibrations, and they can be used to study the stresses that an aircraft structure undergoes. Other uses for accelerometers include studies of the oscillation of automobile springs, the pick-up and braking power of automobiles, and the side load on tires or rails when rounding curves.

One common type of accelerometer is the seismograph, or moving mass, type. In this type of accelerometer, a mass is mounted in a support in such manner that a movement or vibration of the support, together with the inertia of the mass, causes a relative motion of the mass and the support. Means is provided for sensing the relative motion and producing an output signal corresponding thereto. The quality and performance of this type of accelerometer are to a large extent dependent upon the size of the mass, it generally being desirable that the mass be as large as possible. The size of the mass is limited by the overall size of the accelerometer, and in seismograph accelerometers of the prior art, the mass is generally much smaller than the supporting structure. Thus, with the techniques of the prior art, it has not been possible to construct a moving mass accelerometer of high quality in a small package.

There is, therefore, a need for a new and improved seismograph, or moving mass, type accelerometer which overcomes the foregoing and other difficulties encountered with accelerometers heretofore provided.

SUMMARY AND OBJECTS OF THE INVENTION

The present invention provides a seismograph type accelerometer having a cylindrical housing and a sensing mass of substantially the same diameter as the housing. The mass is mounted in the housing by means of resilient members having a central portion fixed relative to the housing and an outer portion attached to the mass. This structure permits the mass in an accelerometer of given size to be on the order of three times as large as it would be utilizing the techniques of the prior art. Fluid is provided in the housing for damping the movement of the mass, and since the larger mass has larger surface area than the masses in conventional accelerometers, the damping effect is enhanced. A plurality of fluid passageways are provided in the mass, and means is provided for closing these passageways to adjust the amount of damping as desired. A variable resistor is mounted in the housing and operably connected to the mass to provide an output signal corresponding to the position of the mass.

It is, in general, an object of the present invention to provide a new and improved accelerometer of the seismograph, or moving mass, type.

Another object of the invention is to provide an accelerometer of the above character in which the sensing mass is larger than the masses in accelerometers heretofore provided.

Another object of the invention is to provide an accelerometer of the above character which includes fluid means for damping the movement of the mass and means for adjusting the amount of damping.

Another object of the invention is to provide an accelerometer of the above character which is small in size, rugged in construction, and reliable in performance.

Additional objects and features of the invention will be apparent from the following description in which the presently preferred embodiment is set forth in detail in conjunction with the accompanying drawings.

DESCRIPTION OF THE PREFERRED EMBODIMENT

Figure 1:
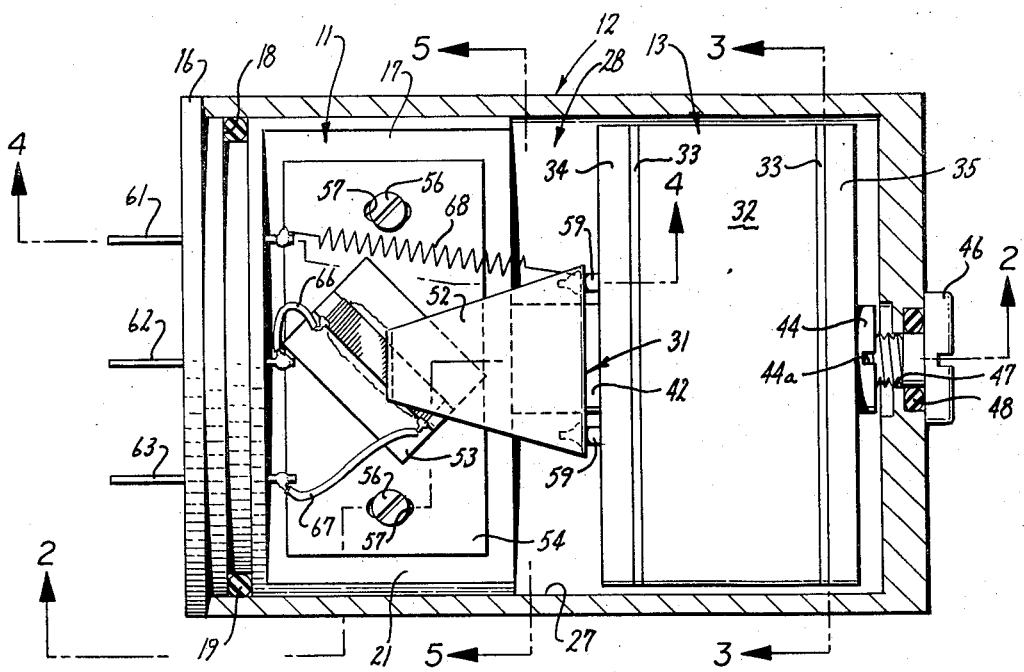
FIG. 1 is a top plan view, partially sectioned, of one embodiment of an accelerometer incorporating the present invention.
Figure 2:
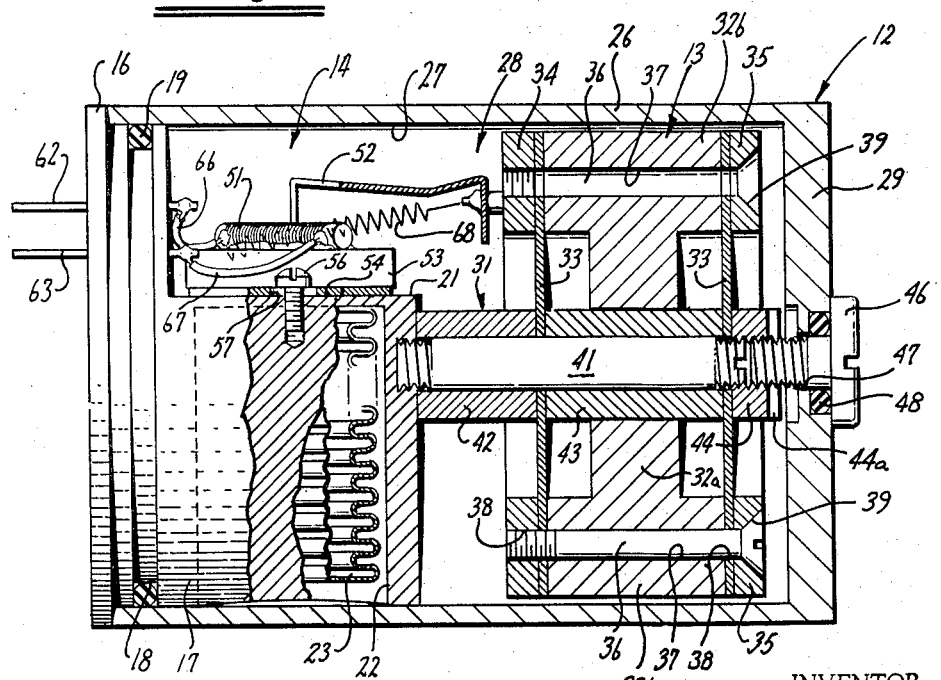
FIG. 2 is a cross-sectional view taken along line 2—2 in FIG. 1.
Figure 3:
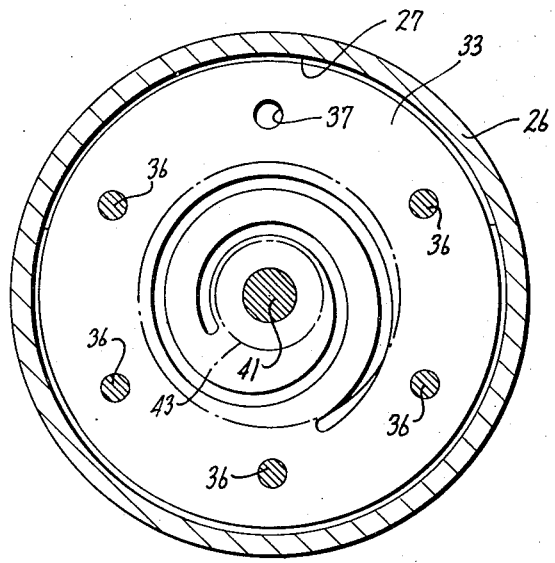
FIG. 3 is a cross-sectional view taken along line 3—3 in FIG. 2.
Figure 4:
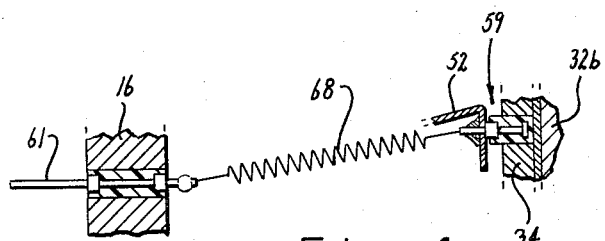
FIG. 4 is a cross-sectional view taken along line 4—4 in FIG. 1.
Figure 5:
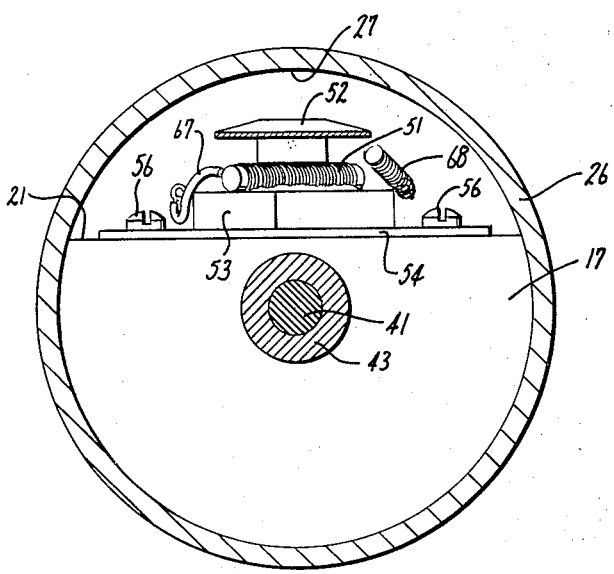
FIG. 5 is a cross-sectional view taken along line 5—5 in FIG. 1.

The accelerometer of the present invention includes a housing comprising a base portion 11 and a cover portion 12, with a mass assembly 13 and an output transducer 14 are mounted therein.

The base portion 11 includes a generally circular flange portion 16 and a generally cylindrical body portion 17. The body portion 17 is formed to include an annular groove 18 in which an O-ring 19 is disposed. A portion of the surface of the body portion 17 is cut away to provide a flat surface 21. The body portion is also formed to include a generally circular recessed area or well 22 in a position generally opposite to the flat surface 21. An air-filled bellows assembly 23 is mounted in the recessed area, one end of the bellows assembly being secured to the bottom wall of the recessed area and the other end being free to move.

The cover portion 12 of the housing comprises a generally cylindrical member 26, and the inner wall 27 of this member defines a cylindrical chamber 28. One end of the cover portion is closed by an end wall 29, and the other end fits over the body portion of the base, with the O-ring 19 engaging the inner wall 27 to provide a hermetic seal.

A spindle assembly 31 extends coaxially from the base portion 11 and provides means for mounting the mass assembly 13. The mass assembly includes a mass member 32 comprising an inner web portion 32a and an annular outer portion 32b. The mass member is mounted coaxially of the spindle assembly and base and constrained for movement axially thereof by a pair of resilient members 33. Each of the resilient members comprises a generally flat spiral-shaped member fabricated of a material such as beryllium copper or Ni-Span-C. In the preferred embodiment, these members are selected to provide substantially linear deflection over the range of acceleration to be measured. The central portions of the resilient members are fixedly mounted on the spindle assembly, and the outer portions of these members are attached to the annular portion of the mass member by means of annular clamping rings 34, 35 and a plurality of circumferentially spaced apart screws 36. The screws pass through bore holes 37 which extend in an axial direction through the annular portion of the mass member. Bore holes 38 are provided in the annular clamping rings in registry with the bore holes 37, the bore holes in the ring 34 being threaded to provide means for engaging the threads of the screws 36. The bore holes in the ring 35 are countersunk, as indicated at 39, to receive the heads of the screws 36.

The spindle assembly 31 includes an axially extending threaded member 41 which is threadedly mounted in the base portion 11. Spacers 42 and 43 are slidably mounted on the threaded member 41 and retained in place by a nut 44 at the outer end of the threaded member. The resilient members 33 are clamped between the spacers 42 and 43 and between the spacer 43 and the nut 44. The nut extends axially beyond the end of the threaded member 41 and is formed to include a slot 44a adapted for receiving the blade of a conventional screw driver. A cover retaining screw 46 is threadedly mounted in the outer portion of the nut 44. This screw passes through an opening 47 in the end wall 29 of the cover portion of the housing, and an O-ring 48 provides a seal around this opening.

A damping fluid 49 is provided in the chamber 28 for damping the movement of the mass assembly 13. In the preferred embodiment, this fluid is a light weight oil which fills the region surrounding the mass assembly and also the region in the recessed area surrounding the bellows assembly 23. Thus, the bellows assembly provides a region of variable volume in communication with the remainder of the chamber. This variable volume permits the fluid to remain at a substantially constant pressure, regardless of temperature. Without the expandable volume, high temperatures could produce pressures within the housing which would rupture it, and low temperatures could produce a vacuum which would cause the fluid to boil.

The output transducer 14 includes a variable resistor or potentiometer comprising an elongate resistive element 51 and a movable wiper or brush 52 which engages the surface of the resistive element. The resistive element is cemented to a small rectangular block 53 which in turn is cemented to a mounting plate 54. The plate 54 is mounted on the flat surface 21 of the body portion of the housing by means of screws 56 passing through mounting holes 57. The wiper 52 is mounted on the mass assembly 13 by means of insulative post assemblies 59. The axis of the resistive element 51 is inclined at an angle relative to the axis of the housing and mass assembly. This angle can be adjusted so that the wiper will travel across a predetermined length of the resistive element when the mass assembly moves a distance corresponding to a predetermined acceleration level. The initial adjustment of the angle is made by the position in which the block 53 is cemented to the mounting plate 54, and finer adjustments can be made by means of the screws 56 and the elongated holes 57.

A plurality of electrically conductive pins or terminals 61-63 are provided in the base portion of the housing for making connections to the output transducer. The two ends of the resistive element 51 are connected to the pins 62 and 63 by leads 66 and 67, respectively, and the wiper 52 is connected to the pin 61 by a flexible lead 68.

The accelerometer can be mounted in a vehicle or on a machine by means of a mounting flange attached to the accelerometer housing. This flange can be attached to the base portion of the housing when it is desired to orient the axis of the accelerometer in a direction normal to the surface on which the unit is mounted, and the mounting flange can extend tangentially of the surface of the cover member when the axis is to be aligned with the mounting surface. If desired, the accelerometer can be mounted by other conventional mounting means.

Operation and use of the accelerometer can now be described briefly. Let it be assumed that the accelerometer has been installed in a vehicle and that the terminals 61-63 have been connected to a conventional source of electrical energy and monitoring means. This source and monitoring means might, for example, include a battery connected between the terminals 62 and 63 and a meter connected for monitoring the voltage level of the terminal 61 relative to the terminals 62 and 63. When the vehicle is at rest or moving at a constant velocity, the mass assembly 32 is held in a rest position by the resilient members 33. The wiper 52 will be in its rest position on the resitive element 51, and a signal corresponding to this rest position will be sensed by the monitoring means. When the vehicle accelerates or changes its velocity, all of the accelerometer except the mass assembly 32 and wiper arm 52 move with it. The relative movement between the mass assembly and the base portion of the housing causes the wiper to move away from its rest position on the resistive element, and this movement is sensed by the monitoring means. The damping fluid serves to dampen the movements of the mass assembly to prevent undesired responses such as those which vibrations might otherwise produce.

It is to be noted that with the resilient members 33 mounted inside the annular portion of the mass member 32, the outside diameter of the mass member is substantially equal to the inside diameter of the cover member 26 and the chamber 28. This structure permits the mass to be on the order of three times as large as the masses in conventional accelerometers of equivalent size. The larger mass substantially increases the sensitivity of the accelerometer, and it also displaces a greater volume of fluid than would be displaced by a smaller mass. Because a larger volume of fluid is displaced, the fluid can have a relatively low viscosity, thereby enhancing the damping action provided by it.

The screws 36 and bore holes 37 and 38 provide means for adjusting the amount of damping. Since the bore holes extend through the mass assembly in an axial direction, they form flow passageways through which the damping fluid can flow. The flow passageways are, of course, blocked off when the screws 36 are inserted in them. However, by providing a greater number of bore holes than are required for holding the mass assembly together, the screws can be omitted from the extra holes to provide flow passageways as desired. Thus, the damping characteristic of the accelerometer can be adjusted simply by removing and inserting the screws 36.

It is apparent from the foregoing that a new and improved accelerometer has been provided. Utilizing the techniques of the present invention, an accelerometer having a range on the order of plus and minus 15g can be built into a unit having a length on order of 1 inch and a diameter on the order of ¾ inch. Such an instrument has a resolution on the order of 0.4 percent and is capable of withstanding shocks on the order of 60g. Because of its small size and rugged construction, the accelerometer is particularly suitable for use in missles and other high speed aircraft. While only the presently preferred embodiment has been described in detail, as will be apparent to those familiar with the art, certain changes and modifications can be made without departing from the scope of the invention as defined by the following claims.

I claim:

1. In an accelerometer, a housing comprising a base portion and a generally cylindrical cover portion defining an axially extending chamber of predetermined diameter, a spindle member extending coaxially of the chamber, a mass member mounted on the spindle member and adapted for movement axially thereof, said mass member having substantially the same diameter as the chamber and a generally cylindrical outer surface disposed in close proximity to the inner wall of the chamber, said mass member also having a plurality of openings extending in an axial direction through the outer portion thereof, damping fluid in the chamber for damping movement of the mass member, a generally flat radially disposed spiral-shaped resilient member having a central portion affixed to the spindle member, threaded members disposed in certain of the openings in the mass member and affixing the outer portion of the resilient member to the outer portion of the mass member, others of the openings being open to permit damping fluid to pass through the mass member but being adapted to receive additional threaded members whereby the amount of fluid passing through the mass member can be adjusted to control the amount of damping, and transducer means within the housing operably connected to the mass member for producing an output signal corresponding to the position of the mass member.

2. An accelerometer as in claim 1 wherein the transducer includes a resistive element mounted on the base portion of the housing, said element being inclined relative to the axis of the chamber, and a movable contact operably connected to the mass member and slidably engaging the resistive element.

3. An accelerometer as in claim 1 together with temperature compensation means for the damping fluid comprising bellows means mounted in the base portion of the housing, said bellows means defining a region of variable volume in communication with the chamber.

4. An accelerometer as in claim 1 wherein the mass member includes a cylindrical inner portion and an annular outer portion, said outer portion being elongated axially relative to said inner portion.

5. An accelerometer as in claim 4 wherein the outer portion of the resilient member is affixed to a radially extending surface of the annular outer portion of the mass member.

* * * * *